Sept. 15, 1964 E. J. PARSI 3,149,061
REMOVAL OF DISSOLVED SALTS AND SILICA FROM LIQUIDS
Filed Feb. 19, 1962 2 Sheets-Sheet 1

A = ANION PERMEABLE MEMBRANE
C = CATION PERMEABLE MEMBRANE

Inventor:
Edgardo J. Parsi,
by
Attorney

A = ANION PERMEABLE MEMBRANE
C = CATION PERMEABLE MEMBRANE

United States Patent Office 3,149,061
Patented Sept. 15, 1964

3,149,061
REMOVAL OF DISSOLVED SALTS AND
SILICA FROM LIQUIDS
Edgardo J. Parsi, Wellesley Hills, Mass., assignors to
Ionics, Incorporated, Cambridge, Mass., a corporation
of Massachusetts
Filed Feb. 19, 1962, Ser. No. 174,147
8 Claims. (Cl. 204—180)

This invention relates to the operation and processes for the substantially complete removal of dissolved solids from liquids under the influence of an electric current. More particularly it relates to the removal of silica in the form of silicates of silicic acid or the removal of other weakly ionized acids from said liquids by electrodeionization.

It is the object of this invention to provide a process and apparatus for continuous and substantially complete removal of dissolved salts and silica from liquids, in particular from boiler feed water to be used in high pressure boilers. This invention provides an electrodeionization apparatus of the multi-membrane type in which the spaces or liquid compartments defined by the ion-exchange membranes are filled or bridged by fluid permeable beds of ion-exchange material which provides an electrical conductive path since the liquid passing through the filled resin compartments may have a high electrical resistance. The filler ion-exchange material also performs the function of adsorbing the last traces of salts or silica in the same manner as occurs in the non-electric resin bed methods of deionization, but with the advantage of avoiding a separate step for regeneration of the exhausted ion-exchange material. According to the present invention, the exchange filler materials are continuously and automatically regenerated while remaining within the liquid compartments. This is accomplished by operating the electrodeionization apparatus at current densities sufficient to produce polarization at the liquid interface of the membranes or resin particles resulting in the dissociation of water. The ions thus formed are used advantageously to regenerate the exchange material located in the diluting compartments. For the purposes of this disclosure, polarization is defined as the dissociation of water molecules into hydrogen and hydroxyl ions. In the operation of membrane units, so-called polarization films can form adjacent to the inner surfaces of those membranes that define the desalting compartments. This phenomenon occurs if a high current density is used whereby the film of liquid which is in immediate contact with the membrane or resin interface becomes depleted of ions, so that further current can only be transferred by the hydrogen and hydroxyl ions thereby formed at the depleted film. Polarization is thoroughly discussed in a publication called "Limiting Currents in Membrane Cells" by Rosenberg and Tirrell, Industrial & Engineering Chemistry, volume 49, page 780, April 1957.

These and various other objects, features and advantages of the invention will appear more fully from the detailed description which follows accompanied by the drawings. To better understand the invention, the description is made with specific reference to certain preferred embodiments and with reference to the demineralization of water containing dissolved salt and silica; however, it is not to be construed as limited thereto except as defined in the appended claims. By way of example the use of this invention for the substantially complete demineralization of liquids, and in particular to the removal of silica, will now be described in detail with reference to the accompanying drawings in which:

Figure 1:
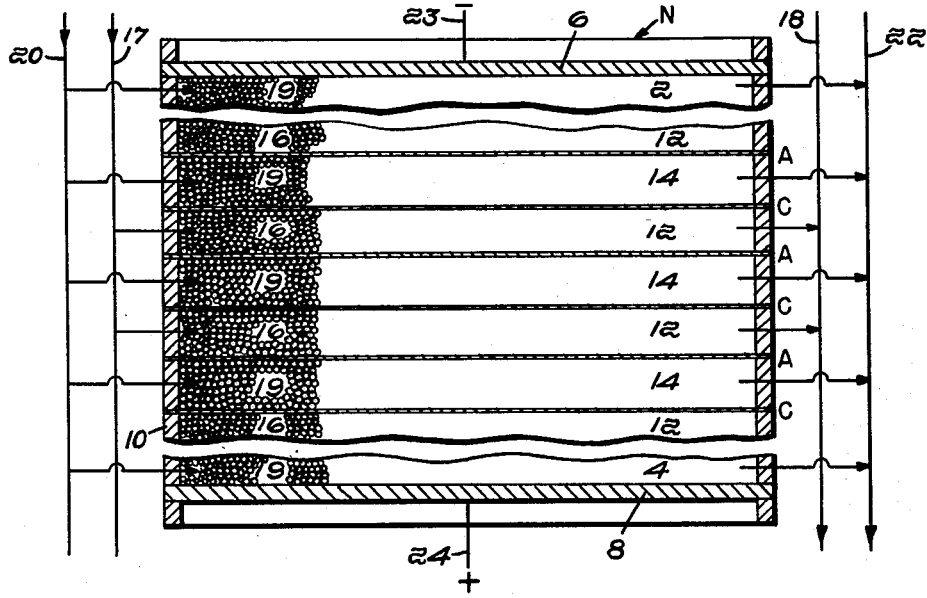
FIGURE 1 is a side elevational, schematic sectional view of one embodiment of this invention for the removal of silica.
Figure 3:
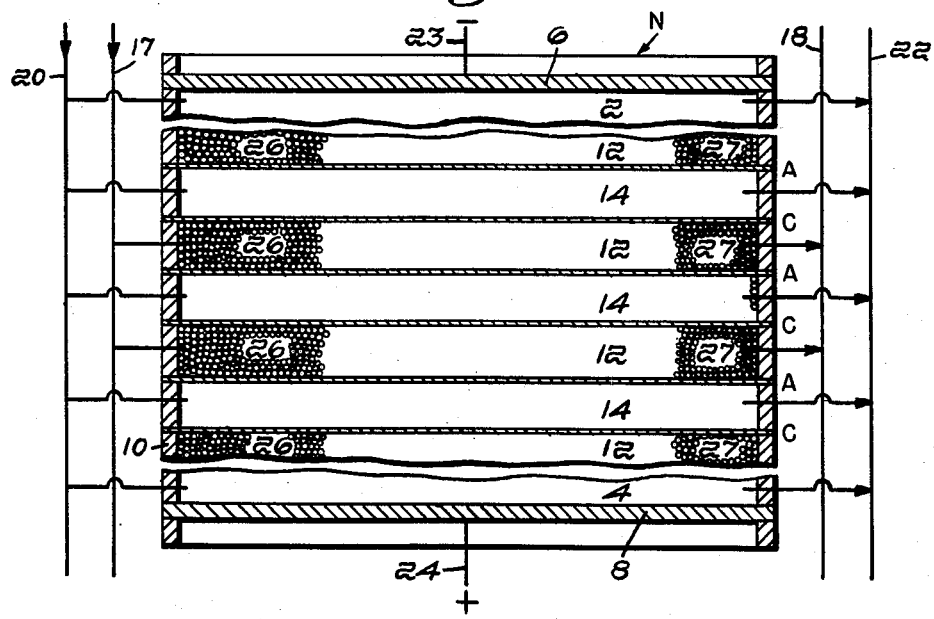
FIGURE 3 represents a diagrammatic sketch of another embodiment of FIGURE 2, wherein the arrangement of separate units are combined in a single unit for the removal of both salt and silica from aqueous solutions thereof.

FIGURE 1 represents a multi-compartment unit for the removal of weakly ionized acids from liquids, in particular silica removal from water which is relatively free from dissolved salts. The unit N comprises a plurality of compartments or chambers, the two end chambers being the cathode chamber 2 and the anode chamber 4 having disposed respectively therein a negative electrode or cathode 6 and the positive electrode or anode 8. Between the electrodes is a stack of ion-exchange permeable membranes of cations and anions arranged alternately and separated from each other by gasketing spacers 10 so as to define a plurality of alternating diluting chambers 12 and concentrating or flushing chambers 14. There are many commercially available ion-permselective membranes which may be employed. The manufacture and properties of cation-permselective membranes is disclosed in U.S. Patents No. 2,702,272; No. 2,730,768; No. 2,731,408; and No. 2,731,411; similarly, for anion-permselective membranes, in U.S. Patents No. 2,730,768; No. 2,800,445; and No. 2,860,097. The diluting chambers contain therein a fluid-permeable bed or filler 16 comprising granular, spherical or fibrous shapes of a strong base anion exchanger which are readily available commercially (such as Dowex 1, Dowex 2, Dowex 21k, all manufactured by the Dow Chemical Company and being trade names for anion exchangers incorporating a quaternary ammonium type of structure). Inlet means for feeding the solution to be treated to the diluting chambers 12 are provided for by manifold inlet 17, and outlet means for the treated solution are indicated by manifold 18. Similarly, the concentrating chambers 14 and electrode chambers 2 and 4 may be filled or packed with a fluid-permeable, ion-exchange material 19. Since the purpose of the filler in the concentrating and electrode chambers is to form a supporting conductive bridge between the spaced membranes, said material can be composed of anion or cation exchangers alone, or preferably an intimate mixture of both. Where the wash solution in the concentrating and electrode chambers contains a sufficient amount of ions to carry current across said cells, no conductive filler material is necessary. This arrangement is shown in FIGURE 3. However, where distilled water is used as the feed liquid to the concentrating chambers, it would be necessary to use filler material in said chamber to form a conductive bridge therein. The inlet means for providing a washing solution into the concentrating and electrode chambers are provided for by manifold 20, and outlet means for such waste solution is indicated by manifold 22. Means for passing a D.C. potential transversely through the stack of membranes and filled resin compartments is provided for through leads 23 and 24 from an outside source of electric current (not shown).

The operation of the electrodeionization unit of FIGURE 1 may be illustrated for example in the removal of silica in the form of silicic acid from water which is relatively free from other dissolved ionizable material, preferably less than 10 p.p.m. of ionizable material. The water is fed preferably in parallel to the diluting chambers 12 by manifold conduit means 17, said liquid passing through the macroporous fillers of ion-exchange material 16 and out through effluent manifold conduit 19. Similarly, the silica containing water or distilled water is introduced preferably by parallel flow into concentrating chambers 14 and electrode chambers 2 and 4 by inlet manifold means 20, said liquid passing through the resin bed located therein and out by means of effluent manifold 22. The liquids in all chambers are flowed in a direction parallel to the membrane surface and at right angles to the path of the flow of electric current. Upon the impression of a polarizing current transversely across the unit, migration of silica anions from the filler resin of the diluting chambers into the concentrating chambers will occur—the solution then being withdrawn from the unit substantially free from silica.

A possible theoretical explanation of the method of silica removal, that is the fixation of silica on the anion resin, and the regeneration of the resin into the hydroxyl form may be explained as occurring in two separate steps. First, silica which is usually present in the water as silicic acid ($H_2SiO_3$) enters the diluting chamber filled with the hydroxyl form of a strong base anion exchanger, said weakly ionized silicic acid, on contact with a resin particle, is removed from the water by adsorption on said anion resin. Using the symbol $[R_4N]^+$ for the radical of a strongly basic anion exchanger, the reaction involved in the removal of weakly ionized acids such as silicic acid is:

Reaction 1:

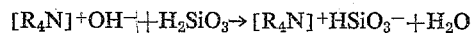

Secondly, under the force of an electrical potential, migration of the silica anion $(HSiO_3)^-$ in the direction of the anode occurs via the conducting bridge of anion resin particles, finally contacting and passing through the anion-permeable membrane into the adjacent concentrating or flushing chamber. Since further migration of the silica anion is prevented by the cation membrane barrier, said anion will collect in the concentrating chamber and be flushed out as a waste stream. To maintain ionic balance, the positively-charged hydrogen ions which are formed in the diluting chamber from the dissociation of water, will migrate out of said chamber but in the opposite direction to that of the silica anion; that is, through the cation membrane and finally ending up in the adjacent concentrating chamber. The excess hydroxyl ions remaining in the diluting chamber provide the necessary basic environment for replacement of the migrating silica ions previously adsorbed on the anion resin, thus regenerating said filler resin back to the hydroxyl form to effect further removal of silicic acid from the surrounding solution. The regeneration process appears to occur as follows:

Reaction 2:

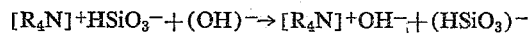

Figure 2:
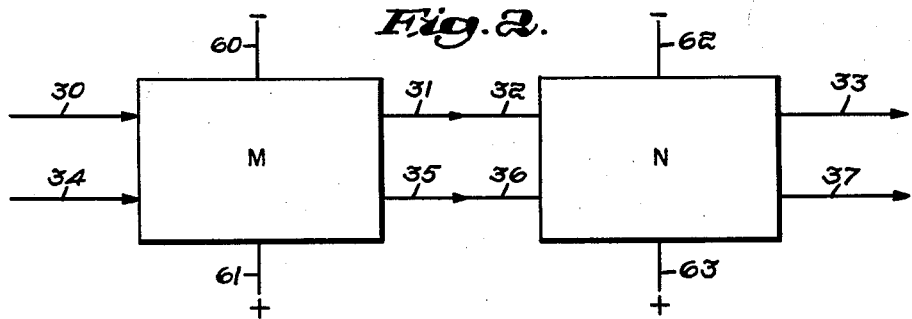
FIGURE 2 is a diagrammatic sketch of another embodiment of this invention employing separate electrodeionizing units for salt removal and silica removal.

FIGURE 2 is another embodiment of the invention showing diagrammatically a method of removing strongly ionized materials for example NaCl and also weakly ionized acids such as silicic acid from liquids by employing two separate electrodeionization units. Unit M represents a multi-compartment unit for the removal of the highly ionized materials; and N, a unit for the removal of weakly acid components as described in FIGURE 1 above. Unit M is structurally identical with N (as shown in FIGURE 1) except that the filler material in the diluting chambers is comprised of an intimate mixture of a strong base anion exchanger and strong acid cation exchanger preferably in a volume ratio of two parts anion to one part cation resin. An example of a strong acid cation resin is Dowex 50, a sulfonated copolymer of styrene and divinyl benzene, manufactured by the Dow Chemical Company. In general, the liquid to be treated is fed to the diluting chambers of Unit M by influent means 30, said liquid passing through the filler of mixed bed resins and collecting at effluent means 31 as desalted liquid, said liquid flowing then into the diluting chambers of silica removal Unit N by influent means 32, passing through the anion resin filled beds and emerging as substantially ion-free liquid at effluent means 33. Simultaneously, a stream of the liquid is directed in parallel flow to the electrode and concentrating chambers of Unit M by influent means 34, said liquid collecting at effluent means 35, directed into electrode and concentrating chambers of Unit N by influent means 36, and emerging from said chambers at effluent means 37 as an ion-enriched stream. Means for passing a polarized direct current transversely through each unit is provided for at leads 60, 61, 62, and 63 from an outside source (not shown). The operation of the units under polarized current densities will result in the formation of hydrogen and hydroxyl ions in the diluting chambers which will effect regeneration of the ion-exchange resin beds contained therein. Prior to the liquid entering Unit M, it is preferable to add to the liquid concentrating and electrode feed streams a small amount of acid to prevent possible scale formation in said concentrating chambers due to insoluble hydroxide salts that may otherwise accumulate therein.

For purposes of efficient removal of weakly ionized acid components, for example silicic acid, it is necessary that the liquid entering Unit N be relatively free of strongly ionized materials such as NaCl, etc. It is preferable that the concentration of said material be less than 10 p.p.m. The common anions, such as chlorides and sulfates, have a greater affinity for adsorption on the strong base anion exchanger than the silica anion, and any appreciable concentration of said common anions would compete and interfere with the exchange and removal of silica. These interfering anions are removed by prior treatment of the liquid in an electrodeionization Unit M as shown in FIGURE 2. If a single pass of the liquid through one unit does not remove the required amount of salt, a series of units can be arranged in which the liquid flows in series through each single unit, each removing in one pass an aliquot share of the salt; or, a sole unit can be employed by which the liquid to be desalted is continuously recirculated therein until the required salt removal is attained. The number of compartments or cell pairs to be employed in electrodeionization units can be varied depending upon the particular application and production rate required. A cell pair is defined as comprising a diluting and concentrating chamber, said units can therefore be comprised of a single cell pair or 100 cell pairs or more.

It can be appreciated that instead of employing separate salt and silica removal units, a single unit as shown in FIGURE 3 can be constructed to perform the same removal. Said unit would contain chambers having an extra long liquid flow path area. The first portion of the inlet flow path area of the diluting chambers 12 would contain a filler 26 of mixed cation- and anion-exchange resins and the remaining latter portion (or effluent area) of the flow path area containing only a strong base anion-exchange resin 27. The solution to be treated is passed into the filled diluting chambers, coming in contact first with the mixed cation-anion filler bed and secondly with the anion bed. Thus on applying a polarizing direct current across the unit, the highly ionized material, such as NaCl, is first removed by passage through the mixed resin bed; and the remaining weakly ionized acids, such as silicic acid, is removed on further passage through the anion exchange bed. In effect, said unit combines a salt and silica removal unit into a single compact design which functions to remove dissolved electrolytes in their proper and necessary sequence.

The following examples are illustrative of the practice of this invention and are not intended to be limiting:

*Example 1*

An electrodeionization unit of the design of FIGURE 1 comprising five cell pairs was used to treat a solution of distilled water made up to contain 20 p.p.m. of dissolved silica. The cathode was made of stainless steel 304 and the anode of platinum. The cation-exchange membranes were made of a sulfonated copolymer of styrene and divinyl benzene and the anion-exchange membranes of a quaternized copolymer of 2-vinyl pyridine and divinyl benzene. These membranes are commercially available from Ionics, Incorporated, Cambridge, Massachusetts. The filler material in the diluting chambers comprised beads of Dowex 1, a strong base anion exchanger; the concentrating and electrode chambers contained a mixture of Dowex 1 and a strong acid-cation exchanger, Dowex 50. The silica water was fed to the diluting chambers at a rate of 170 millimeters per minute. The water was also fed to the concentrating and electrode chambers at this same rate.

The unit was operated at a current density of 3 to 3.5 milliamps per square centimeter of membrane area and at steady state conditions the water emerging from the diluting chambers analyzed to less than 0.05 p.p.m. of silica. When the D.C. current to the unit was shut off, no silica removal was effected. On reapplying current, silica removal was immediately re-established.

*Example 2*

A combination of electrodeionization units as described in FIGURE 2 was employed for removal of highly ionized salts and silica. The combination comprised a first and second unit for salt removal and a third unit for silica removal. The same type membranes and electrodes were employed in all the units as previously described in Example 1 above. The two salt removing units comprised five cell pairs each, the diluting chambers containing an intimate mixture of two parts by volume of Dowex 1 (a strong base anion exchanger) to one part of Dowex 50 (a strong acid cation exchanger). The third unit comprised four cell pairs, otherwise it was similarly constructed as that of the silica removal unit of Example 1 above.

The water to be treated was Cambridge, Massachusetts, tap water having a specific resistance of ~7000 ohm centimeter and containing ~100 p.p.m. of dissolved ionized salts in which 4 p.p.m. was dissolved silica. The water was fed to the first unit, passing then in series flow through the second and third units and emerging in two streams, an ion-free water stream and an enriched ion stream. The flow rates to the diluting and concentrating streams were 170 milliliters per minute. Sulfuric acid was added to the concentrating and electrode feed water to obtain a pH of about 6 or less. A polarizing direct current was applied across each unit and at steady state operation, the following results were obtained:

The first salt removal unit operated at 125 milliamps and at 20 volts. The effluent from the diluting stream gave a specific resistance of 100,000 ohm centimeters corresponding to ~5 p.p.m. of dissolved highly ionized salts. There was no silica removal effected.

The second salt removal unit operated at 60 milliamps at 15 volts and produced a diluting stream effluent of one million ohm centimeters water, which corresponds to ~0.1 p.p.m. of dissolved highly ionized salts. There was no silica removal effected by this unit.

The third unit for silica removal operated at 50 milliamps and 30 volts. The product effluent from this unit contained less than 0.05 p.p.m. of silica and had a specific resistance of better than 2 million ohm centimeters.

*Example 3*

A single electrodeionization unit of the general design as that used in FIGURE 3 was employed to remove salts and silica from Cambridge, Massachusetts, tap water. This unit differed from the unit employed in Example 1 in three respects:

(1) The length of the flow path of all chambers was four feet long—as compared to the one-foot length employed in the unit of Example 1;

(2) Commencing at the inlet flow area of all the diluting chambers for a distance of three feet into the flow path, the filler material of ion-exchange resin was composed of an intimate mixture of one part by volume of a strongly acid cation exchanger to one part of a strongly basic anion exchanger. The remaining one-foot length of the flow path area contained a filler of only strongly basic anion exchanger; and (3) The concentrating and electrode chambers employed no filler material.

In effect, this present unit combined the separate salt removal and silica removal units of Example 2 into a single unit performing the same function.

The tap water was fed into the inlet sections of all diluting chambers at a total flow rate of 175 millimeters per minute. The same tap water adjusted to a pH of 5.6 with sulfuric acid was fed into the concentrating and electrode chambers at the same flow rate.

The unit was operated at a current of 200–250 milliamps which was sufficient to cause polarization within the diluting chambers. At steady state operation the water emerging from the diluting chambers contained less than 0.07 p.p.m. of silica and had a specific resistance of 1.8 to 2.0 million ohm centimeters.

Thus, having described the invention, what is claimed is:

1. A process for the removal of strongly ionized electrolytes and weakly ionized acids from aqueous solutions containing a mixture of the same, the process comprising subjecting the solutions to electrodeionization successively in two separate electrodeionization units, each unit comprised of a cathode chamber at one terminal end, an anode chamber at the opposite terminal end, said chambers containing a cathode and an anode respectively, the body of each unit as defined by the terminating electrodes comprising a plurality of alternating diluting and concentrating chambers defined by alternating cation and anion ion-exchange permeable membranes, at least the diluting chambers of the first electrodeionization unit containing a fluid permeable filler of ion-exchange material, said material of said diluting chambers comprising a mixture of strong base anion exchanger and strong acid cation exchanger, at least the diluting chambers of the second electrodeionization unit containing a fluid-permeable filler of ion-exchange material, said material of said diluting chambers comprising a strong base anion exchanger, passing the feed solution into the diluting chambers of the first unit to substantially remove the strongly ionized electrolytes therefrom, passing the effluent from said chambers into the diluting chambers of the second unit, passing a second feed solution into the concentrating and electrode chambers of the first unit, passing the effluent of said chambers into the concentrating and electrode chambers respectively of the second unit, passing a direct current potential transversely across the body of each of said units, said current being sufficient to dissociate water into hydrogen and hydroxyl ions within the diluting chambers, and withdrawing separate streams of deionized liquid and ion-enriched liquid from said second unit.

2. The process of claim 1 wherein the weakly ionized component of the liquid to be treated comprises silicic acid.

3. The process of claim 1 wherein the weakly ionized component of the liquid to be treated comprises acetic acid.

4. The process of claim 1 wherein the effluent from the concentrating chambers is removed as an electrolyte-enriched product.

5. An apparatus for the removal of strongly ionized electroyltes and weakly ionized acids from an aqueous solution containing a mixture of the same, comprising in combination a series of multi-compartment electrodeionization units of at least two units, each unit comprised of a cathode chamber at one terminal end, an anode chamber at the opposite terminal end, said chambers containing a cathode and an anode respectively, each unit comprising a plurality of alternating diluting and concentrating chambers, defined by alternating cation and anion permeable membranes, at least the diluting chambers of the last unit of the series containing a fluid-permeable filler of ion-exchange material, said material of said diluting chambers comprising a strong base anion exchanger, at least the diluting chambers of all other units of the series containing a fluid-permeable filler of ion-exchange material, said material of said diluting chambers comprising a mixture of strong base anion exchanger and strong acid cation exchanger, means for introducing liquids to be treated into the diluting compartments of the unit first in series with exit means for withdrawal of said liquid, means for further passing said liquid successively into and out of the diluting compartments of each remaining unit, and final means of withdrawal of said liquid from the last unit of the series, means for introducing a liquid into the concentrating and electrode chambers of said unit first in series with exit means for withdrawal of said liquid, means for further passing said liquid successively into and out of said chambers of each remaining unit, and final means of withdrawal of said liquid from the last unit of the series, and means of passing a direct current transversely across the membranes and filled chambers of each unit.

6. A multi-compartment electrodeionization unit for the removal of strongly ionized electrolytes and weakly ionized acids from an aqueous solution containing a mixture of the same, comprising in combination a plurality of chambers, the two end chambers comprising the electrode chambers, one chamber having disposed therein a negative electrode, the other a positive electrode, said unit comprising a plurality of alternating diluting and concentrating chambers defined by ion-exchange permeable membranes of cations and anions arranged alternately, at least said diluting chambers containing a fluid-permeable filler of ion-exchange material, the initial area of said diluting chambers, commencing at the inlet section of said chambers containing a filler material comprising an intimate mixture of strongly acid cation and strongly basic anion exchanger and wherein the remaining latter area terminating at the effluent section of said chambers containing a filler material comprising strongly basic anion exchanger; means for introducing liquid to be treated into the filled diluting chambers and means for a withdrawal of the liquid from said chambers, means for passing liquid into the concentrating and electrode chambers, and outlet means for withdrawal of liquid from said chambers, and means for passing a direct current transversely across the membranes and chambers.

7. A process for the removal of strongly ionized electrolytes and weakly ionized acids from aqueous solutions containing a mixture of the same comprising passing said aqueous solution as a feed stream through the chambers of an electrodeionization unit comprised of alternating diluting and concentrating chambers defined by alternating cation- and anion-permselective membranes, the terminal chambers of which contain cathode and anode electrodes, at least said diluting chambers containing a fluid permeable filler of ion-exchange material said material of the diluting chambers being selected from the group consisting of strongly basic and strongly acid exchangers, wherein the initial area of the diluting chambers, commencing at the inlet section, contains a filler material comprising an intimate mixture of strongly acid cation and strongly basic anion exchangers, and the remaining latter area of the diluting chambers terminating at the effluent section of said chambers containing a filler material of only strongly basic anion exchanger, passing a direct current transversely through said chambers and membranes, said current being sufficient to dissociate water into hydrogen and hydroxyl ions within the diluting chambers, and removing the effluent from said diluting chambers as a liquid product substantially free of strongly ionized electrolytes and containing a lesser amount of weakly ionized acids than was originally present in said feed solution.

8. The process of claim 7 wherein the weakly ionized component of the liquid to be treated comprises silicic acid.

References Cited in the file of this patent

UNITED STATES PATENTS

| | | |
|---|---|---|
| 2,815,320 | Kollsman | Dec. 3, 1957 |
| 2,897,051 | McIlhenny et al. | July 28, 1959 |
| 2,917,368 | Juda | Dec. 15, 1959 |
| 2,923,674 | Kressman | Feb. 2, 1960 |
| 3,014,855 | Kressman | Dec. 26, 1961 |
| 3,062,739 | Crits | Nov. 6, 1962 |

FOREIGN PATENTS

| | | |
|---|---|---|
| 1,140,856 | France | Mar. 11, 1957 |
| 565,892 | Canada | Nov. 11, 1958 |
| 815,154 | Great Britain | June 17, 1959 |
| 855,681 | Great Britain | Dec. 7, 1960 |
| 866,471 | Great Britain | Apr. 26, 1961 |